United States Patent [19]
Dennis

[11] Patent Number: 5,539,758
[45] Date of Patent: Jul. 23, 1996

[54] UPCONVERSION PUMPED THULIUM FIBER AMPLIFIER AND LASER OPERATING AT 790 TO 830 NM

[75] Inventor: Michael L. Dennis, Alexandria, Va.

[73] Assignee: The United States of America as represented by the Secretary of the Navy, Washington, D.C.

[21] Appl. No.: 376,202

[22] Filed: Jan. 20, 1995

[51] Int. Cl.⁶ ........................................................ H01S 3/30
[52] U.S. Cl. .................. 372/6; 372/41; 372/68; 372/75
[58] Field of Search .................. 372/6, 39, 41, 372/75, 68

[56] References Cited

U.S. PATENT DOCUMENTS

4,967,416  10/1990  Esterowitz et al. ..................... 372/6
5,067,134  11/1991  Oomen ................................... 372/6
5,426,656  6/1995  Tohmon et al. ......................... 372/6

Primary Examiner—Leon Scott, Jr.
Attorney, Agent, or Firm—Thomas E. McDonnell; John J. Karasek

[57] ABSTRACT

The present invention is a fluorozirconate laser host doped with a sufficient amount of $Tm^{3+}$ ions to permit significant emission at a wavelength between about 790 nm and about 830 nm when pumped at a wavelength or wavelengths to excite $Tm^{3+}$ ions from the $^3H_6$ ground state to the $^3F_4$ excited state, and then from the $^3F_4$ excited state to the $^3H_4$ excited state.

27 Claims, 4 Drawing Sheets

UPCONVERSION PUMPED THULIUM FIBER AMPLIFIER AND LASER OPERATING AT 790 TO 830 NM

BACKGROUND OF THE INVENTION

1. Field of the Invention

This invention concerns a thulium doped fluorozirconate host based optical amplifier and laser, and more particularly to an upconversion pumped thulium fluorozirconate amplifier and laser operating at 790–820 nm.

2. Description of the Related Art

A broad-bandwidth fiber laser amplifier at wavelengths in the vicinity of 810 nm is useful for a number of applications including short-haul telecommunications (the so-called first telecommunications window), direct in-fiber generation of high power cw and pulsed laser light, and chirped pulse amplification of ultrashort pulses. To date, no suitable high-power amplifiers in this wavelength range have been demonstrated. To be fully satisfactory, such an amplifier should be high gain (up to 30 dB), high saturation output power (in excess of 20 dBm [100 mW]), and compatible with short-haul fiber optic communications systems.

Configured as a laser, such a system should yield very high powers (in excess of 1 W) directly from a fiber, with high power conversion efficiency (in excess of 35%). Such a laser would be suitable for generation of high peak power pulses via Q-switching or mode locking. It would be desirable to have such a laser and amplifier pumped at a wavelength where efficient, high power sources are readily available so that these high gains and output powers can be obtained with high efficiency.

While no known device suits all these needs, it is noted that there are sources and amplifiers available at this wavelength. Certain solid state lasers, e.g., the titanium doped sapphire (Ti:Al$_2$O$_3$) and chromium doped colquiriites (Cr:LiSAF, Cr:LiCAF), provide laser light tunable over this wavelength range at powers of the order of 1 W. However, these are bulk-optic systems, and so are not directly fiber-compatible. The Ti:Al$_2$O$_3$ amplifier has been extensively developed, however performance of such systems is limited by the relatively short excited state lifetime of the gain, and they must be pumped by, for example, a large frame Ar$^+$ laser requiring high voltage, high current, and chilled water service for operation. Semiconductor diode lasers based on AlGaAs have been developed with output powers greater than 1 W in the wavelength regime of interest. However, high powers are typically achieved with array or broad area devices, which cannot be efficiently coupled to single mode fibers.

The following publications exemplify the art:

Thulium doped fluorozirconate fibers have been used to obtain amplification and lasing in the 800–820 nm band when pumped at 780 nm [J. N. Carter et al., *Electron. Lett.* 26, 1759–61 (1990); J. N. Carter, et al., *J. Lightwave Technol.* 9, 1548 (1991); R. G. Smart, et al., *Electron. Lett.* 28, 58 (1992)]. However, sufficiently high power single mode sources are not available at the pump wavelength to obtain high signal powers (e.g., 1 W and higher).

Operation at 1470 nm has been demonstrated with pumping at 1064 nm [T. Komukai, et al., *Electron. Lett.* 29, 110 (1993); Y. Miyajima, et al., *Electron. Lett.* 29, 660 (1993)]. However, this signal wavelength falls outside of the first telecommunications window. The pumping scheme described by the authors involves a two-step absorption and does not necessarily involve an avalanche absorption process. As will be described below, the inventors believe that an avalanche absorption process is what permits laser output between about 790 nm and about 830 nm when the invention described below is pumped as described below.

Lasing at wavelengths between 478 and 483 nm has been obtained in Tm:ZBLAN fiber when pumped by multiline Nd:YAG laser operating simultaneously at wavelengths of 1112, 1116, and 1123 nm [Grubb, et al., *Electron. Lett.* 28, 1243 (1992)].

SUMMARY OF THE INVENTION

Accordingly, it is an object of this invention to obtain high power lasing and laser amplification at 790 to 830 nm.

It is a further object of this invention to achieve such lasing and laser amplification using an available, compact, readily available high power source, such as an Nd:YAG source.

It is a further object of this invention to achieve both cw and pulsed output.

It is a further object of this invention to achieve output that is suitable for chirped pulse amplification of ultrashort pulses, where the performance of the system is not limited by having a short excitation lifetime, such as the short excitation lifetime of Ti:Al$_2$O$_3$.

It is a further object of this invention to achieve all of the above objects in a fiber optic system.

These and additional objects of the invention are accomplished by the structures and processes hereinafter described.

The present invention is in one aspect a fluorozirconate laser host doped with a sufficient amount of Tm$^{3+}$ ions to permit significant emission at a wavelength between about 790 nm and about 830 nm when pumped at a wavelength or wavelengths to excite Tm$^{3+}$ ions from the $^3$H$_6$ ground state to the $^3$F$_4$ excited state, and then from the $^3$F$_4$ excited state to the $^3$H$_4$ excited state.

The present invention is in another aspect a laser amplifier including (1) a fluorozirconate host doped with a sufficient amount of Tm$^{3+}$ ions to permit significant emission at a wavelength between about 790 nm and about 830 nm when pumped at a wavelength or wavelengths to excite Tm$^{3+}$ ions from the $^3$H$_6$ ground state to the $^3$F$_4$ excited state, and then from the $^3$F$_4$ excited state to the $^3$H$_4$ excited state; and (2) a source of pumping radiation, optically coupled to the Tm$^{3+}$-doped fluorozirconate host.

The present invention is in another aspect a method for amplifying an optical signal having a peak intensity at between about 790 nm and about 830 nm, including: (1) directing an optical signal through a fluorozirconate host doped with a sufficient amount of Tm$^{3+}$ ions to permit significant emission at a wavelength between about 790 nm and about 830 nm when pumped at a wavelength or wavelengths to excite Tm$^{3+}$ ions from the $^3$H$_6$ ground state to the $^3$F$_4$ excited state, and then from the $^3$F$_4$ excited state to the $^3$H$_4$ excited state; and (2) pumping the host with pumping radiation at a wavelength to excite Tm$^{3+}$ ions from the $^3$H$_6$ ground state to the $^3$F$_4$ excited state, and then from the $^3$F$_4$ excited state to the $^3$H$_4$ excited state, to amplify the optical signal.

The present invention is in another aspect a laser including (1) a fluorozirconate host doped with a sufficient amount of Tm$^{3+}$ ions to permit significant emission at a wavelength between about 790 nm and about 830 nm when pumped at a wavelength or wavelengths to excite $Tm^{3+}$ ions from the $^3H_6$ ground state to the $^3F_4$ excited state, and then from the $^3F_4$ excited state to the $^3H_4$ excited state, where the host is disposed in a laser cavity; and (2) a source of pumping radiation, optically coupled to the $Tm^{3+}$-doped fluorozirconate host.

The present invention is in another aspect a method of producing laser light by pumping, with radiation to excite $Tm^{3+}$ ions from the $^3H_6$ ground state to the $^3F_4$ excited state, and then from the $^3F_4$ excited state to the $^3H_4$ excited state, a fluorozirconate host doped with a sufficient amount of $Tm^{3+}$ ions to permit significant emission at a wavelength between about 790 nm and about 830 nm when pumped, where the host is disposed in a laser cavity to permit oscillation.

The present invention is in another aspect a method and apparatus for generating amplified spontaneous emission, including pumping a fluorozirconate host doped with a sufficient amount of $Tm^{3+}$ ions to permit significant emission at a wavelength between about 790 nm and about 830 nm when pumped with pumping radiation at a wavelength to excite $Tm^{3+}$ ions from the $^3H_6$ ground state to the $^3F_4$ excited state, and then from the $^3F_4$ excited state to the $^3H_4$ excited state, to produce emission at a wavelength between about 790 nm and about 830 nm.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

M. L. Dennis et al., High power upconversion lasing at 810 nm in Tm:ZBLAN fibre *Electron. Lett* 30 pp. 136–37 (Jan. 20, 1994) is incorporated by reference herein.

The medium of the invention is a fluorozirconate glass fiber (e.g., ZBLAN=zirconium-barium-lanthanum-aluminum-sodium fluoride composition.) doped with a novel concentration of $Tm^{3+}$ ions, to permit lasing at 790–830 nm when pumped with pump radiation to excite $Tm^{3+}$ ions from the $^3H_6$ ground state to the $^3F_4$ excited state, and then from the $^3F_4$ excited state to the $^3H_4$ excited state, typically between about 1010 nm and about 1100 nm or between about 1350 nm and about 1490 nm. The concentration of $Tm^{3+}$ in the glass is critical to the invention. If the concentration of $Tm^{3+}$ is too high, the matrix properties of the glass will be adversely affected, or competing transitions may begin to dominate. If the concentration is too low, the desired upconversion process may not occur to a significant degree, and this process will be dominated by competing processes.

Figure 1:
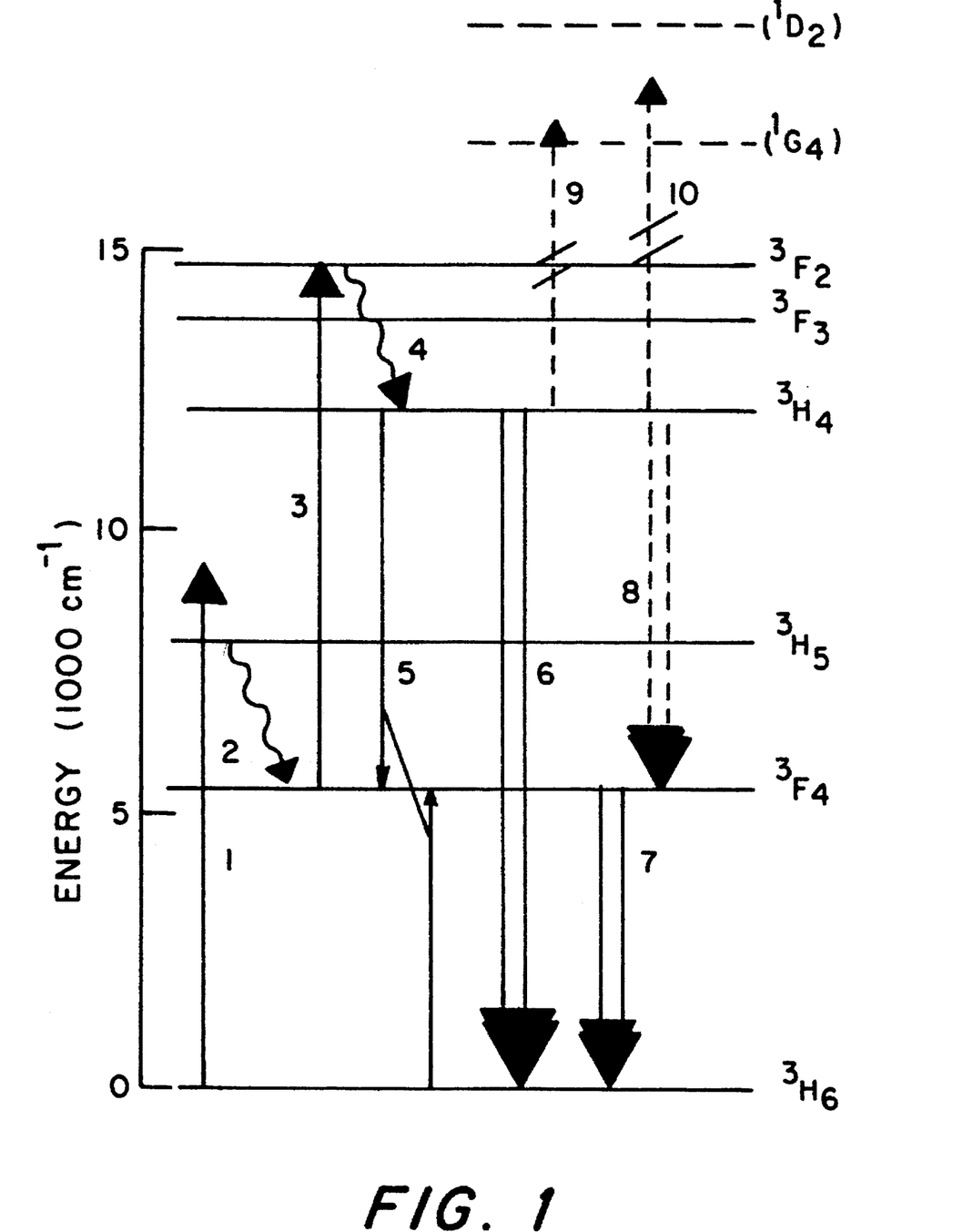
FIG. 1 shows the pumping scheme for the invention, and competing transitions.

Without wishing to be bound by theory, the inventors hypothesize that the avalanche absorption process depicted in FIG. 1 is responsible for the ability to achieve lasing at 790–830 nm when pumped with pump radiation between about 1010 nm and about 1100 nm or between about 1350 nm and about 1490 nm. This avalanche absorption involves a cross-relaxation step. Cross-relaxation is strongly dependent upon concentration, since it requires the interaction of two nearby atoms. Thus, for this avalanche absorption process to occur to a significant degree, it is necessary to have at least a minimum concentration of $Tm^{3+}$ in the host.

On the other hand, it is desired to avoid competing transitions, such as the transitions from the $^3H_4$ level to either the $^1G_4$ level or the $^1D_2$ level. It is also desired to avoid the competing lasing transitions from the $^3H_4$ level to the $^3F_4$ level, and the $^3F_4$ level to the $^3H_6$ level. The concentration of $Tm^{3+}$ in the fluorozirconate host should be selected accordingly.

It should be noted that the energy level diagram depicted in FIG. 1 is frequently (perhaps more often than not) depicted incorrectly in the literature: in much of the literature, the $^3H_4$ level and the $^3F_4$ level are reversed. Compare A. Saissy et al., *Appl. Opt.* 30 1933 (1991) and S. G. Grubb et al., supra, with T. Komukai et al., supra, and J. N. Carter, *Lightwave Tech.*, supra.

Typical concentrations of $TmF_3$ in fluorozirconate fibers according to the invention range from about 0.3 mol % to about 5 mol %. More typical concentrations range from about 0.5 mol % to about 4 mol %. Still more typical concentrations range from about 0.7 mol % to about 3 mol %. Still more typical concentrations range from about 0.8 mol % to about 2.4 mol %. Still more typical concentrations range from about 0.9 mol % to about 2.2 mol %. Still more typical concentrations range from about 1.0 mol % to about 2.0 mol %.

As noted supra, more than one pump band is available to practice the invention. The first pump band ranges from about 1010 nm to about 1100 nm, but more typically will be practiced from about 1040 nm to about 1090 nm, or from about 1060 nm to about 1070 nm. Longer wavelengths (up to ~1150 nm) may be acceptable, so long as one avoids or mitigates excited state absorption at the $^3H_4 \rightarrow ^1G_4$ transition. Pump radiation in this band typically will be centered at 1064 nm, corresponding to the emission of an Nd:YAG laser.

As shown in FIG. 1, the process is initiated by weak absorption of pump photons at 1064 nm (9400 $cm^{-1}$) from the ground state $^3H_6$ to the $^3H_5$ level centered at ~8250 $cm^1$ (step 1), which quickly decays nonradiatively to the long lived $^3F_4$ level at 5650 $cm^{-1}$ (step 2). A second pump photon is absorbed on the $^3F_4 \rightarrow ^3F_2$ transition and/or the $^3F_4 \rightarrow ^3F_3$ transition (~9600 $cm^{-1}$ and ~8900 $cm^1$ respectively, step 3) (in the glasses at room temperature, the two upper levels overlap considerably). Fast nonradiative decay from the $^3F_2/^3F_3$ level (step 4) then populates the metastable $^3H_4$ upper level (~12,400 $cm^{-1}$) of the gain transition, $^3H_4 \rightarrow ^3H_6$ centered at ~805 nm.

As the initial absorption step is very far from resonance (the absorption peak for the $^3H_6 \rightarrow ^3H_5$ transition is centered at ~1225 nm), this two step absorption process alone is too inefficient to generate an inversion on the gain transition. However, in a highly doped material the $Tm^{3+}$ ions are in sufficiently close proximity that an excited ion can cross-relax with a neighbor in the ground state to yield two ions in the first excited state $^3F_4$ (step 5). This pair of ions can then repeat steps 3 through 5 to yield four excited ions. These four excited ions can in turn repeat steps 3 through 5 to yield eight excited ions, which can then yield 16 excited ions, 32 excited ions, and so on to yield a population inversion. Gain/lasing is then obtained (step 6). Processes competing with population of the gain transition include fluorescence and lasing on the $^3F_4 \rightarrow ^3H_6$ (~1860 nm, step 7) and $^3H_4 \rightarrow ^3F_4$ (~1470 nm, step 8) transitions, and excited state absorption of the pump on the $^3H_4 \rightarrow ^1G_4$ (21,250 cm$^{-1}$) transition (step 9) and of the signal on the $^3H_4 \rightarrow ^1D_2$ (27,900 cm$^{-1}$) transition (step 10).

Alternatively, the second pump band is used. The second pump band ranges from about 1360 nm to about 1480 nm, but more typically will be practiced from about 1410 nm to about 1450 nm. In this pumping scheme, the absorption of the second pump photon (step 3 in FIG. 1) is absorbed on the $^3F_4 \rightarrow ^3H_4$ transition, instead of on the $^3F_4 \rightarrow ^3F_2/^3F_3$ transitions. The initial population of the $^3F_4$ intermediate level may then be effected by weak absorption on either the $^3H_6 \rightarrow ^3F_4$ or $^3H_6 \rightarrow ^3H_5$ transitions.

Primary pumping in either of the two above bands may be augmented by auxiliary pumping directly to either the $^3F_4$ or $^3H_5$ levels using light at about 1600–1850 nm or about 1170–1250 nm, respectively. The function of such an auxiliary pump is to initiate the above described avalanche absorption process by cycling population to the $^3F_4$ intermediate level faster than would be possible with single wavelength pumping. This would also have the added benefit of depopulating the $^3H_6$ ground state, enhancing the inversion on the gain transition.

As noted supra, the fiber 12 of the invention is a fluorozirconate host doped with an appropriate concentration of Tm$^{3+}$. While ZBLAN/ZBLANP hosts are considered to be the preferred embodiment of the invention, due to the well developed state of the fabrication technology, other fluorozirconate-based fibers are suitable, including, for example, ZBLA (zirconium-barium-lanthanum-aluminum fluoride), ZBTmAN (zirconium-barium-thulium-aluminum-sodium fluoride), ZBLALi (zirconium-barium-lanthanum-aluminum-lithium fluoride), etc. Moreover, other low phonon energy glass based fibers are suitable, and should be considered equivalents to fluorozirconates. These other low phonon energy glasses include, but are not limited to, thulium doped chalcogenides (the broad class of glasses, certain of which are transparent in the wavelength range of interest, comprising S, Se, and/or Te, frequently in combination with, variously, Si, Ge, Sn, P, As, and/or Sb), tellurites (e.g., Te-Ba-Zn-Y-oxides), phosphates, cadmium fluorochloride glasses (or mixed halide glasses, e.g., comprising fluorides and chlorides of Cd, Na, Ba, and K), fluoroaluminates (e.g., comprising Al-Y-Mg-Ca-Sr-Ba fluorides), lead germanates (e.g., comprising oxides of Ge, Pb, Ba, Zn, and K) and other heavy metal fluoride glasses, such as the fluorohafnates (analogous to the fluorozirconates, but with Hf substituting for Zr), BIZYT/BATY/BZYT (comprising, variously, Ba, In, Zn, Y, Al, and Tm fluorides), etc.

Optimally, the length of the fiber 12 is selected so that there is just sufficient pump intensity in the fiber to effect the $^3H_4$–$^3H_6$ population inversion throughout the length of the fiber. Preferably, between 50% and 90% of the pump radiation is absorbed by the fiber. Since the mode field diameter and dopant concentration are fixed for a given sample of fiber, the simplest way to control the pump absorption is to control the length of the fiber. For a ZBLAN clad fiber with a 12 μm ZBLANP core doped with 1 mol % Tm, and a numerical aperture of 0.077 at 810 nm, fiber lengths of 20–40 cm have been used successfully.

The fiber 12 optimally is single mode, but may be multimode.

Figure 2:
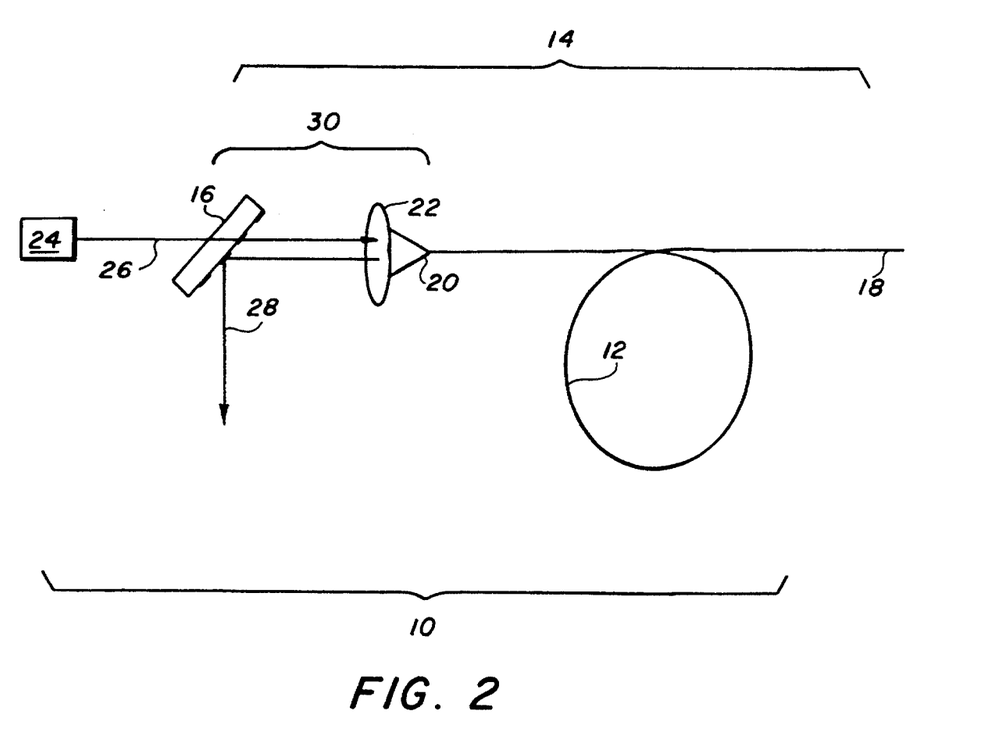
FIG. 2 is a representation of tile laser of the invention.

Regarding the laser 10 of the invention, a simple embodiment of the invention is depicted in FIG. 2. The Tm:fluorozirconate fiber 12 of the invention is disposed in a cavity 14, which may be defined by, e.g., the launch facet 20 and the back facet 18 of the fiber 12. At sufficiently high pump power, the fiber 12 will lase with only the 4% reflections from the front and back facets 20, 18, if the facets are preferably cleaved perpendicular to the fiber 12. Pump light 26 from a pump source 24 typically passes through coupling optics 30, and is launched into the fiber 12. The pump light is guided by the fiber and absorbed by the thulium dopant, thereby producing signal light 28, which is separated from the pump by, e.g., a dichroic mirror 16.

In a simple embodiment, the coupling optics 30 include a dichroic mirror 16 and a microscope objective lens 22. The dichroic mirror typically is a high reflector of oblique signal light (typically at 45)° and partially transmitting of pump light 26. The microscope objective lens 22 focuses light onto the launch facet 20 of the fiber 12. Alternative coupling optics include all the known ways of launching light into a fiber, e.g., wavelength division multiplexers, focusing mirrors, etc. The launch end 20 of the fiber 12 typically is prepared by standard fiber cleaving techniques so that the fiber endface (facet) is perpendicular to the fiber axis for laser operation. For amplifier operation, as described below, the launch facet typically will be angled (2°–5° typical).

Figures 2A, 2B, 2C:
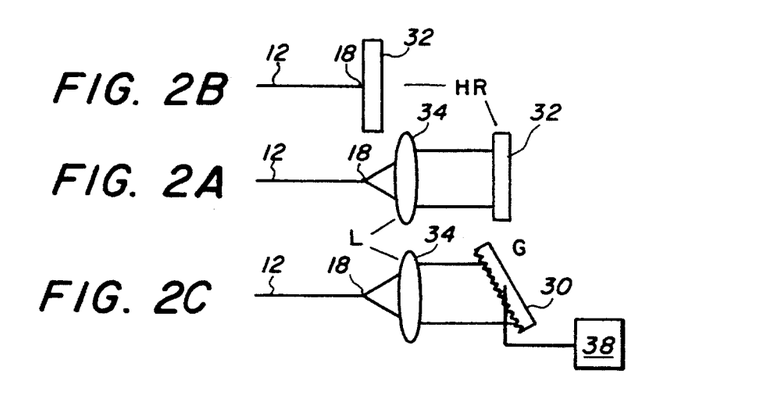
FIGS. 2A, 2B, and 2C are representations of different embodiments for configuring an end of the laser of the invention.

In an alternative laser embodiment, as shown in FIG. 2B, the back facet 18 of the fiber 12 is butted directly to a mirror 32 which is highly reflective at the signal wavelength. In another alternative laser embodiment, as shown in FIG. 2A, the back facet 18 of the fiber 12 may be angle cleaved and the output coupled via a lens 34 to a high reflector 32.

Tunable laser operation is achieved, as shown in FIG. 2C, by disposing a tuning element 36, such as a grating, a prism, or a birefringent tuning plate, into the cavity, and operationally coupling this tuning element to a motor or other means 38 for rotating the element 36. A simple way of doing this is to replace the mirror 32 with a grating, and to connect the grating to a motor 38 for rotating the grating.

Figure 3:
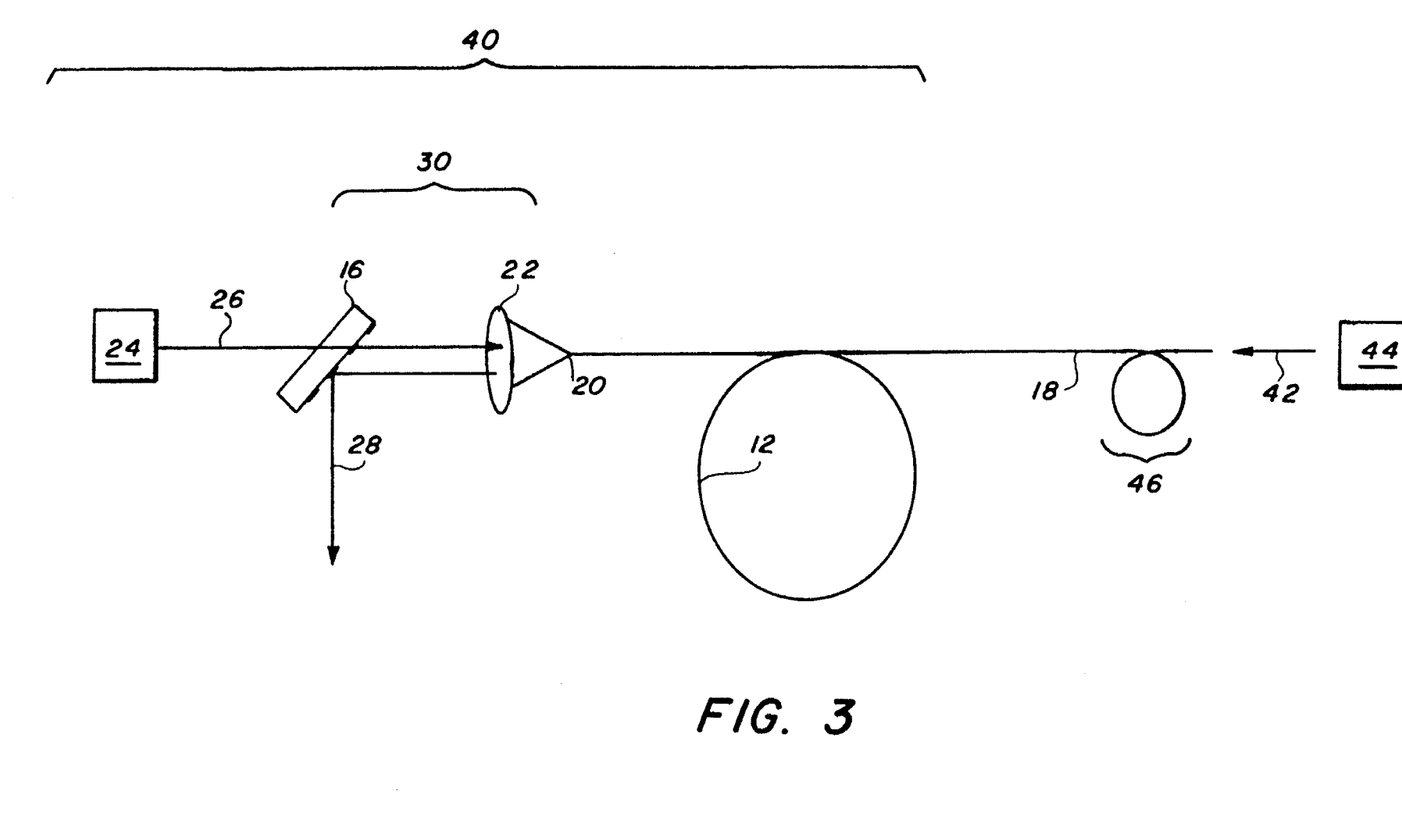
FIG. 3 is a representation of the amplifier of the invention.

Regarding the laser amplifier of the invention, shown in FIG. 3, rather than being configured to permit oscillation, the invention is configured to permit input signal light 42 to be directed into one end 18 of the fiber 12 through input coupling optics 46. Pump radiation 26 from a pump source 24 is launched into the fiber 12 through coupling optics 30, and the input signal 42 is amplified and emitted as an output signal 28. The input signal may be input from the end of the fiber opposing the input of the pump radiation (as shown in FIG. 3) or, alternatively, the input signal may be input from the same end of the fiber as the pump radiation.

Suitable pump sources for both laser and amplifier operation should operate in one of the pump bands noted supra. For operation in the first pump band, suitable pump sources include any of the neodymium lasers (e.g., Nd:YAG, Nd:YLF, Nd:YAlO, Nd:glass) lasing on the $^4F_{3/2} \rightarrow ^4I_{11/2}$ transition, or even semiconductor diode lasers operating in this pump band. For operation in the second pump band, suitable pump sources include the Cr:YAG laser, the NaCl color center laser, and InGaAsP diode lasers.

Having described the invention, the following examples are given to illustrate specific applications of the invention, including the best mode now known to perform the invention. These specific examples are not intended to limit the scope of the invention described in this application.

EXAMPLE 1

Laser Operation

Figure 4:
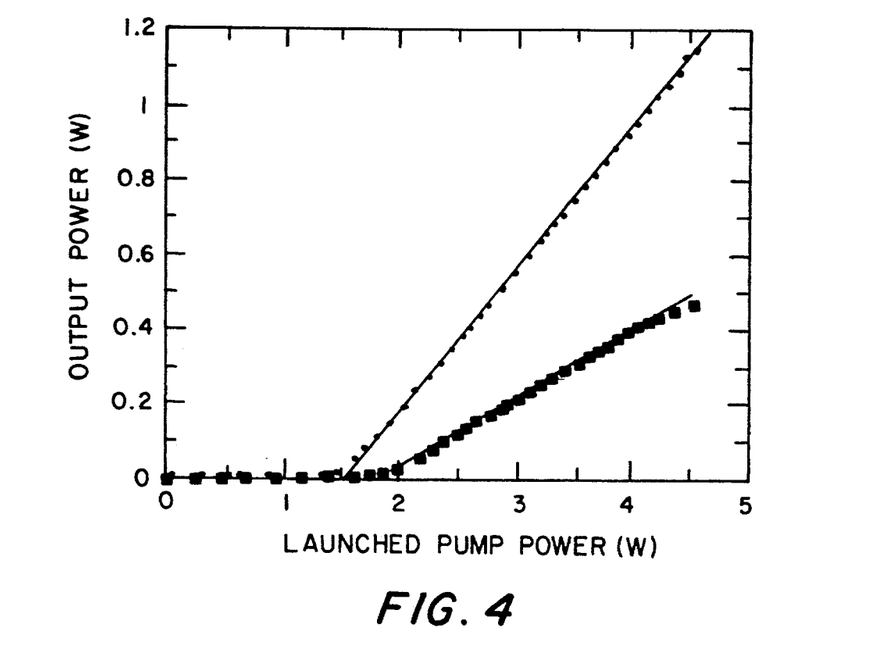
FIG. 4 shows exemplary output power versus launched pump power curves for the invention.

The apparatus shown in FIG. 2 was assembled. Pump light from a cw Nd:YAG laser was passed through a dichroic mirror which is a high reflector for ~810 nm at 45° and partially transmitting at ~1064 nm. The pump light was then launched into the gain fiber (ZBLAN cladding, ZBLANP core doped with 1.0 mol % Tm measured as the fraction of fluorides in the melt) by a microscope objective (focal length 16 mm, numerical aperture 0.4). The launch end of the fiber was prepared by standard fiber cleaving techniques so that the fiber endface (facet) was perpendicular to the fiber axis. The pump light was guided by the fiber and absorbed by the thulium dopant The fiber length was varied, lengths ranging from 20–40 cm were used. The front (launch) facet was used as the output coupler (96% output coupling, 4% feedback), and the rear endface of the fiber was cleaved perpendicular to the fiber (likewise 96% output coupling, 4% feedback). With a 35 cm fiber, lasing was obtained with 18% slope efficiency and round trip gain of ~30 dB. Results are shown in the lower trace of FIG. 4.

EXAMPLE 2

Laser Operation using a lens and a High Reflectance Mirror

Example 1 was repeated, except that the back fiber end was angle cleaved and the output coupled via a lens to a high reflector, as in FIG. 2A. Lasing was obtained at powers in excess of 1.2 W with slope efficiency of 37% and a threshold launched pump power of <1.5 W. Results are shown in the upper trace of FIG. 4. Powers of up to 2 W have been demonstrated by optimization of pumping configuration, fiber length, etc, according to the teachings herein.

EXAMPLE 3

Laser Operation using a High Reflectance Mirror

Example 1 was repeated, except that the back fiber end was butted directly to a mirror which is highly reflective at ~810 nm, as shown in FIG. 2B. Results were essentially identical as those for Example 2.

EXAMPLE 4

Tunable Laser Operation using a Lens and a Grating

Figure 5:
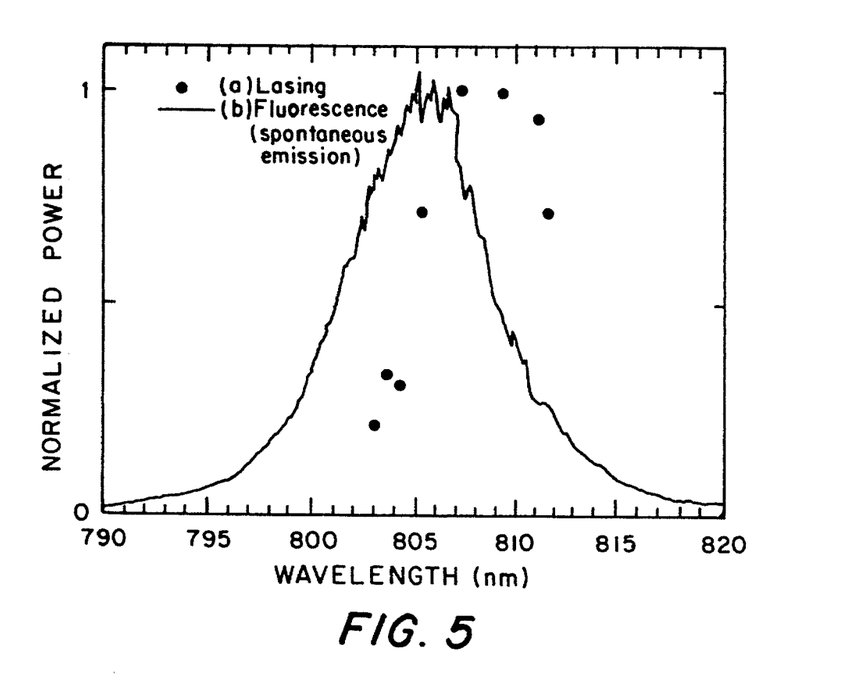
FIG. 5 shows tile emission spectrum of Tm:ZBLAN, with superimposed datapoints showing observations of single wavelength lasing.

Example 2 was repeated, except that a grating (gold coated, 1200 lines/mm, blazed for 1064 nm) mounted on a stage for rotating the grating was substituted for the high reflector. Tunability has been demonstrated over the range 803–816 nm, as shown in FIG. 5. Given the breadth of the fluorescence spectrum, also shown in FIG. 5, it is anticipated that this range may be extended from 790–830 nm.

EXAMPLE 5

Laser Amplifier Operation

The apparatus shown in FIG. 3 was assembled. The pump source was cw Nd:YAG laser. The pump radiation was passed through a dichroic mirror. The pump light was then launched by a microscope objective into the gain fiber. The launch end of the fiber was prepared by standard fiber cleaving techniques so that the fiber endface (facet) was angled (2°–5°) with respect to the fiber axis. The dichroic mirror, microscope objective, and gain fiber were the same as those used in Example 2.

The input signal source was a tunable Ti:Al$_2$O$_3$ laser. The back facet was prepared with an angle cleave (1°–3° typical.) The coupling optics (a single mode mode fiber with a numerical aperture of 0.077 at 810 nm, butt coupled to the back facet) launched the input signal into the gain fiber. With 33 cm of gain fiber and 1.4 W of pump, small signal gains of up to 30 dB have been obtained. Output powers of the amplified signal in excess of 0.5 W have also been obtained. Gains in excess of ~10 dB are observed at wavelengths of <800 nm up to 820 nm.

EXAMPLE 6

Amplified Spontaneous Emission Source Operation

Example 5 was repeated, except that the fiber length was chosen to be sufficiently long (>60 cm) that nearly all of the launch pumped power was absorbed. Broadband amplified spontaneous emission light was observed, as shown in the fluorescence spectrum of FIG. 5, with powers of ~50 mW at a launched pump power of ~5 W.

As the fiber used in this implementation is multimode, the peak pump intensity and pump/signal overlap are not optimum, leading to comparatively inefficient pumping. Despite this fact, these results show that the conversion of pump-to-signal is quite efficient: the observed 37% slope efficiency compares well with the maximum attainable efficiency for this pumping scheme of 65.7% (determined as the quantum defect of the gain transition photon energy with respect to twice the pump photon energy.) Likewise, the fact that this slope efficiency is approximately twice that for the cleaved facet laser indicates that the absorbed pump is being efficiently converted to the signal. In addition to the fiber being multimode, these results are limited by the pump power damage threshold of the fiber (~7 W) and by simultaneous colasing at ~1870 nm on the $^3F_4 \rightarrow ^3H_6$ transition. It is anticipated that these results could be improved by using single mode fiber and quenching the competing transition, with potential output powers of a few watts.

Obviously, many modifications and variations of the present invention are possible in light of the above teachings. It is therefore to be understood that, within the scope of the appended claims, the invention may be practiced otherwise than as specifically described.

What is claimed is:

1. A laser amplifier, comprising:
    a fluorozirconate fiber host doped with Tm$^{3+}$ ions, for radiation emission at a wavelength between about 790 nm and about 830 nm, responsive to pumping radiation at a wavelength or wavelengths between about 1010 nm and about 1100 nm;
    means for pumping said Tm$^{3+}$-doped host at a wavelength or wavelengths between about 1010 nm and about 1100 nm;
    signal input coupling means; and
    signal output coupling means.
2. The laser amplifier of claim 1, wherein said means for pumping comprises a neodymium solid state laser.
3. The laser amplifier of claim 1, wherein said means for pumping comprises a laser positioned to direct pumping radiation into the end of said fiber.

4. The laser amplifier of claim 1, wherein said means for pumping is optically coupled to said host through coupling optics, said coupling optics further comprising a dichroic mirror having a high reflectance for radiation at between about 1010 nm and about 1100 nm, and partially transmitting radiation at wavelengths between about 790 nm and 830 nm.

5. The laser amplifier of claim 1, wherein said fiber host is a single mode fiber host.

6. The laser amplifier of claim 1, wherein said fiber host comprises between about 0.3 mol % and about 5 mol % $Tm^{3+}$.

7. The laser amplifier of claim 1, wherein said fiber host comprises between about 0.5 mol % and about 4 mol % $Tm^{3+}$.

8. The laser amplifier of claim 1, wherein said fiber host comprises between about 0.7 mol % and about 3 mol % $Tm^{3+}$.

9. The laser amplifier of claim 1, wherein said fiber host comprises between about 0.8 mol % and about 2.4 mol % $Tm^{3+}$.

10. The laser amplifier of claim 1, wherein said fiber host comprises between about 1.0 mol % and about 2.0 mol % $Tm^{3+}$.

11. A laser, comprising:

a fluorozirconate host doped with $Tm^{3+}$ ions, for radiation emission at a wavelength between about 790 nm and about 830 nm, responsive to pumping radiation at a wavelength or wavelengths between about 1010 nm and about 1100 nm, wherein said host is disposed in a laser cavity; and means for pumping said $Tm^{3+}$-doped host at a wavelength or wavelengths between about 1010 nm and about 1100 nm.

12. A method for amplifying an optical signal, said signal having a peak intensity at between about 790 nm and about 830 nm, comprising:

directing an optical signal having a peak intensity at between about 790 nm and about 830 nm through a fluorozirconate host doped with $Tm^{3+}$ ions, for radiation emission at a wavelength between about 790 nm and about 830 nm, responsive to pumping radiation at a wavelength or wavelengths between about 1010 nm and about 1100 nm; and pumping said host with pumping radiation at a wavelength between about 1010 nm and about 1100 nm, thereby amplifying said optical signal.

13. The method of claim 12, wherein said step of pumping said host with pumping radiation comprises pumping said host to establish a population inversion between the $^3H_4$ excited state of said $Tm^{3+}$ ions and the $^3H_6$ ground state of said $Tm^{3+}$ ions.

14. The method of claim 12, wherein said step of pumping said host with pumping radiation comprises pumping said host to excite $Tm^{3+}$ ions from the $^3H_6$ ground state to the $^3H_4$ excited state, in an avalanche absorption process.

15. A method for producing coherent optical emission at a wavelength between about 790 nm and about 830 nm, comprising:

pumping a fluorozirconate host doped with $Tm^{3+}$ ions, for radiation emission at a wavelength between about 790 nm and about 830 nm, responsive to pumping radiation at a wavelength or wavelengths between about 1010 nm and about 1100 nm, wherein said host is disposed in a laser cavity to permit oscillation, with pumping radiation at a wavelength between about 1010 nm and about 1100 nm.

16. A method for generating amplified spontaneous emission, comprising:

pumping a fluorozirconate host doped with $Tm^{3+}$ ions, for radiation emission at a wavelength between about 790 nm and about 830 nm, responsive to pumping radiation at a wavelength to excite $Tm^{3+}$ ions from the $^3H_6$ ground state to the $^3F_4$ excited state, and then from the $^3F_4$ excited state to the $^3H_4$ excited state, to produce emission at a wavelength between about 790 nm and about 830 nm.

17. A laser amplifier, comprising:

a fluorozirconate fiber host doped with $Tm^{3+}$ ions, for radiation emission at a wavelength between about 790 nm and about 830 nm, responsive to pumping radiation at a wavelength or wavelengths between about 1350 nm and about 1490 nm;

means for pumping said $Tm^{3+}$-doped host at a wavelength or wavelengths between about 1350 nm and about 1490 nm;

signal input coupling means; and signal output coupling means.

18. The laser amplifier of claim 17, wherein said means for pumping is optically coupled to said host through coupling optics, said coupling optics further comprising a dichroic mirror having a high reflectance for radiation at between about 1350 nm and about 1490 nm and partially transmitting radiation at wavelengths between about 790 nm and 830 nm.

19. The laser amplifier of claim 17, wherein said means for pumping comprises a neodymium solid state laser.

20. The laser amplifier of claim 17, wherein said means for pumping comprises a laser positioned to direct pumping radiation into the end of said fiber.

21. A laser, comprising:

a fluorozirconate host doped with $Tm^{3+}$ ions, for radiation emission at a wavelength between about 790 nm and about 830 nm, responsive to pumping radiation at a wavelength or wavelengths between about 1350 nm and about 1490 nm, wherein said host is disposed in a laser cavity; and means for pumping said $Tm^{3+}$-doped host at a wavelength or wavelengths between about 1350 nm and about 1490 nm.

22. A method for amplifying an optical signal, said signal having a peak intensity at between about 790 nm and about 830 nm, comprising:

directing an optical signal having a peak intensity at between about 790 nm and about 830 nm through a fluorozirconate host doped with $Tm^{3+}$ ions, for radiation emission at a wavelength between about 790 nm and about 830 nm, responsive to pumping radiation at a wavelength or wavelengths between about 1350 nm and about 1490 nm; and pumping said host with pumping radiation at a wavelength between about 1350 nm and about 1490 nm, thereby amplifying said optical signal.

23. A method for producing coherent optical emission at a wavelength between about 790 nm and about 830 nm, comprising:

pumping a fluorozirconate host doped with $Tm^{3+}$ ions, for radiation emission at a wavelength between about 790 nm and about 830 nm, responsive to pumping radiation at a wavelength or wavelengths between about 1350 nm and about 1490 nm, wherein said host is disposed in a laser cavity to permit oscillation, with pumping radiation at a wavelength between about 1350 nm and about 1490 nm.

24. A laser amplifier, comprising:

a fluorozirconate fiber host doped with $Tm^{3+}$ ions, for radiation emission at a wavelength between about 790 nm and about 830 nm, responsive to pumping radiation at a wavelength or wavelengths to excite $Tm^{3+}$ ions from the $^3H_6$ ground state to the $^3F_4$ excited state, and then from the $^3F_4$ excited state to the $^3H_4$ excited state;

means for pumping said $Tm^{3+}$-doped host at a wavelength or wavelengths to excite $Tm^{3+}$ ions from the $^3H_6$ ground state to the $^3F_4$ excited state, and then from the $^3F_4$ excited state to the $^3H_4$ excited state;

signal input coupling means; and signal output coupling means.

25. A laser, comprising:

a fluorozirconate host doped with $Tm^{3+}$ ions, for radiation emission at a wavelength between about 790 nm and about 830 nm, responsive to pumping radiation at a wavelength or wavelengths to excite $Tm^{3+}$ ions from the $^3H_6$ ground state to the $^3F_4$ excited state, and then from the $^3F_4$ excited state to the $^3H_4$ excited state, wherein said host is disposed in a laser cavity; and means for pumping said $Tm^{3+}$-doped host at a wavelength or wavelengths to excite $Tm^{3+}$ ions from the $^3H_6$ ground state to the $^3F_4$ excited state, and then from the $^3F_4$ excited state to the $^3H_4$ excited state.

26. A method for amplifying an optical signal, said signal having a peak intensity at between about 790 nm and about 830 nm, comprising:

directing an optical signal having a peak intensity at between about 790 nm and about 830 nm through a fluorozirconate host doped with $Tm^{3+}$ ions, for radiation emission at a wavelength between about 790 nm and about 830 nm, responsive to pumping radiation at a wavelength or wavelengths to excite $Tm^{3+}$ ions from the $^3H_6$ ground state to the $^3F_4$ excited state, and then from the $^3F_4$ excited state to the $^3H_4$ excited state; and pumping said host with pumping radiation at a wavelength or wavelengths to excite $Tm^{3+}$ ions from the $^3H_6$ ground state to the $^3F_4$ excited state, and then from the $^3F_4$ excited state to the $^3H_4$ excited state, thereby amplifying said optical signal.

27. A method for producing coherent optical emission at a wavelength between about 790 nm and about 830 nm, comprising:

pumping a fluorozirconate host doped with $Tm^{3+}$ ions, for radiation emission at a wavelength between about 790 nm and about 830 nm, responsive to pumping radiation at a wavelength or wavelengths to excite $Tm^{3+}$ ions from the $^3H_6$ ground state to the $^3F_4$ excited state, and then from the $^3F_4$ excited state to the $^3H_4$ excited state, wherein said host is disposed in a laser cavity to permit oscillation, with pumping radiation at a wavelength or wavelengths to excite $Tm^{3+}$ ions from the $^3H_6$ ground state to the $^3F_4$ excited state, and then from the $^3F_4$ excited state to the $^3H_4$ excited state.

* * * * *

UNITED STATES PATENT AND TRADEMARK OFFICE
CERTIFICATE OF CORRECTION

PATENT NO. : 5,539,758

DATED : July 23, 1996

INVENTOR(S) : Michael L. Dennis et al.

It is certified that error appears in the above-identified patent and that said Letters Patent is hereby corrected as shown below:

Title page, item [19], line 2,
        Change "Dennis" --Dennis et al.--.
        Title page, item [75],
        Change "Inventor: Michael L. Dennis, Alexandria, VA" to --Inventors: Michael L. Dennis, Alexandria, VA; Jonathan W. Dixon, Bowie, MD--.

Signed and Sealed this

Twenty-ninth Day of October 1996

Attest:

BRUCE LEHMAN

*Attesting Officer*     *Commissioner of Patents and Trademarks*